United States Patent [19]

Moons

[11] 4,109,781
[45] Aug. 29, 1978

[54] DEVICE FOR ROTATING BY 90° THE MOVEMENT DIRECTION OF PALLETS AND SIMILAR BETWEEN TWO CONVEYING TRACKS

[75] Inventor: Hugo Moons, Bonheiden, Belgium

[73] Assignee: Alvey, Inc., St. Louis, Mo.

[21] Appl. No.: 777,958

[22] Filed: Mar. 16, 1977

[30] Foreign Application Priority Data

Mar. 22, 1976 [BE] Belgium ................................ 016544

[51] Int. Cl.² ............................................ B65G 47/52
[52] U.S. Cl. .................................... 198/485; 198/457; 198/467; 198/631
[58] Field of Search .............. 198/407, 409, 457, 467, 198/469, 485, 489, 631, 809

[56] References Cited

U.S. PATENT DOCUMENTS

| 2,739,691 | 3/1956 | Boehm | 198/409 |
| 2,809,739 | 10/1957 | Temple | 198/467 |
| 2,856,055 | 10/1958 | Moss et al. | 198/485 |
| 2,883,031 | 4/1959 | MacCurdy | 198/489 |
| 2,894,518 | 7/1959 | Ryan et al. | 198/407 |
| 2,914,170 | 11/1959 | Kent | 198/489 |
| 2,954,863 | 10/1960 | Staples, Jr. | 198/409 |
| 3,067,851 | 12/1962 | O'Rourke, Jr. | 198/631 |
| 3,134,476 | 5/1964 | Pierson et al. | 198/457 |
| 3,195,710 | 7/1965 | Robinson | 198/485 |
| 3,241,652 | 3/1966 | Glendy | 198/489 |

*Primary Examiner*—Evon C. Blunk
*Assistant Examiner*—Richard K. Thomson
*Attorney, Agent, or Firm*—Gravely, Lieder & Woodruff

[57] ABSTRACT

A conveying device for transferring articles, such as pallets, between a first conveyor running in one direction and at one level and a second conveyor running in a right angular direction to the first conveyor and at a different level, wherein the article transfer is accomplished by a power operated mechanism which not only controls the movement of the article between the conveyors but also accomplishes the change in levels between the conveyors.

5 Claims, 8 Drawing Figures

DEVICE FOR ROTATING BY 90° THE MOVEMENT DIRECTION OF PALLETS AND SIMILAR BETWEEN TWO CONVEYING TRACKS

BRIEF SUMMARY OF THE INVENTION

This invention relates to conveying devices for transferring articles between conveying tracks and changing the direction of movement of the articles in accomplishing the transfer.

The invention has for its objects and installation for moving articles, such as pallets, on conveying tracks which are arranged to change the direction of movement by 90°, to effect the transfer under conditions controlling the acceleration and deceleration of the articles, and to provide an installation in which the transfer of the articles takes place between a first conveyor at one elevation and a second conveyor at a different elevation.

The foregoing objects are accomplished by an installation which is comprised of a frame fitted with conveying rollers and positioned to receive at least one article at a time at a level of a first supply conveyor and movable to transfer the article to a lower level while simultaneously changing the direction of conveyance of the article, whereby means are provided: to drive the conveying rollers at a first speed when the article is fed to the frame, to decrease the roller speed as the article moves toward the end position on the frame and to stop the conveying rollers when the article has reached the end position on the frame; and to move the frame in an angular direction along a slanting surface to set the article on a second conveyor and simultaneously to move the article in the direction of the second conveyor, and to bring the frame back along the same slanting surface to the level of the first conveyor when the transferred article has been moved to a distance to clear the article from the frame.

In a first embodiment, said intallation comprises essentially a hydraulic motor which is connected into a hydraulic circuit which on the first hand drives the conveying rollers supported in a frame and on the other hand operates a hydraulic motor to move the frame with the conveying rollers, and wherein the operation of the hydraulic motors is controlled through a series of valves and means to control the valves in accordance with the position of an article in the installation, as well as for controlling the direction of movement of the conveying rollers and the speed of rotation or stoppage of the conveying rollers.

In a second embodiment, the invention is comprised of a first motor means which controls the rotation of the conveying rollers, and a second motor means which acts to move the conveying rollers in a frame along a slanting surface, whereby control means regulate simultaneously the rotation speed of the first motor means "and the movement effect of the second motor means on the frame". in accordance with the position of an article on the frame supporting conveying rollers.

Other details and features of the present invention will be pointed out in the description given below by way of non-limitative examples and with reference to the accompanying drawings.

BRIEF DESCRIPTION OF THE DRAWING

The invention is disclosed in the accompanying drawings, wherein.

DETAILED DESCRIPTION OF THE INVENTION

It has been pointed out above that the invention embodies a device for transferring articles between a first conveyor running in one direction and at one level and a second conveyor running in a different direction from the first conveyor and located at a different level, wherein the article transfer is accomplished by power operated mechanisms which control the speed of the articles during the transfer and also is accomplished by the change in levels between conveyors.

To effect the transfer of articles from a first conveying track to a second conveying track which is related at an angle of 90°, it is essential to progressively reduce the speed with which the articles are passed by the first conveyor onto the second conveyor, and to change the direction of movement of the articles while also changing the elevation and to combine with the change in elevation a control over velocity of the article along the direction of travel of the second conveying track. The objective of this invention may be carried out by hydraulic or electro-mechanical means, utilizing a frame fitted with conveying rollers and positioned at the end of the first conveying track, but movable in a direction to deposit the articles on the second conveying track with an increment of speed and direction of movement complimenting the second conveying track.

Figure 1:
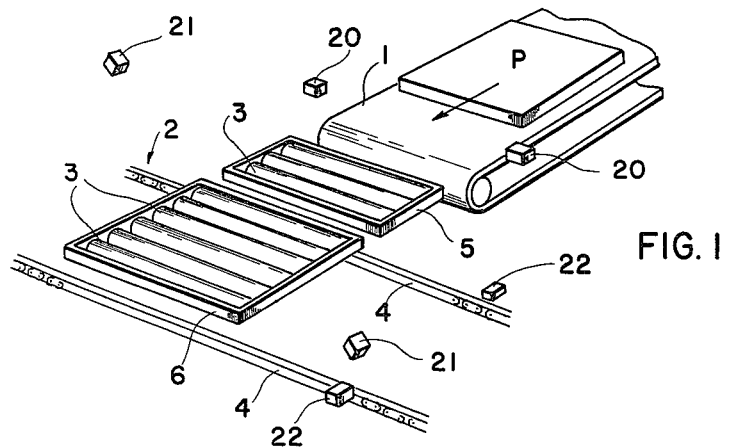
FIGS. 1, 2 and 3 are diagrammatic perspective views of a progression of three positions of one article in the form of a pallet, particularly illustrating the various positions of the article during its transfer between the first and second conveyors.
Figure 2:
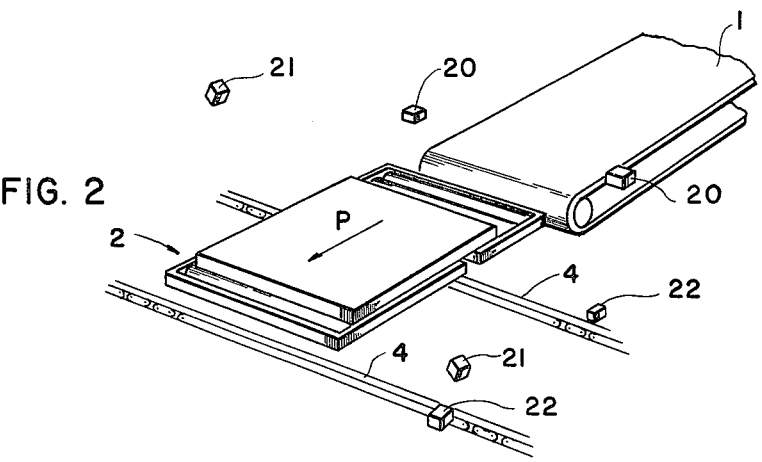
Figure 3:
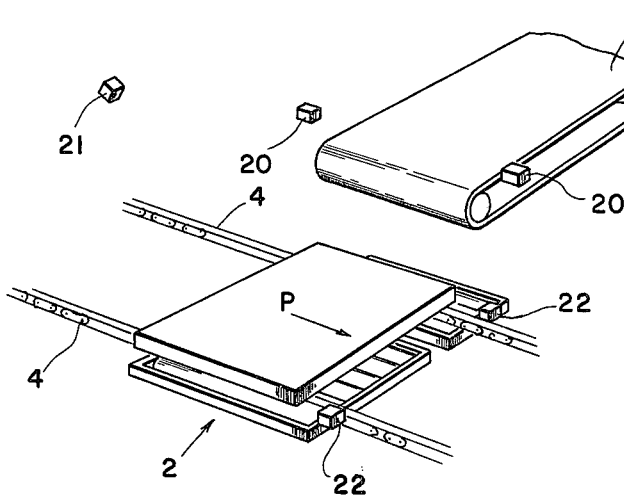

It can be seen in FIG. 1 that the first conveying track 1 may be in a form of a belt conveyor for delivering articles, such as pallets P, to the end of the belt conveyor where there is situated a frame 2 fitted with conveying rollers 3 supported in sections 5 and 6 of the frame 2. The frame 2, according to FIGS. 2 and 3, is located over the second conveying track which consists in spaced apart parallel chains 4. The frames 5 and 6 are arranged in spaced relation so as to provide a space for the passage of one of the chains 4.

Figure 4:
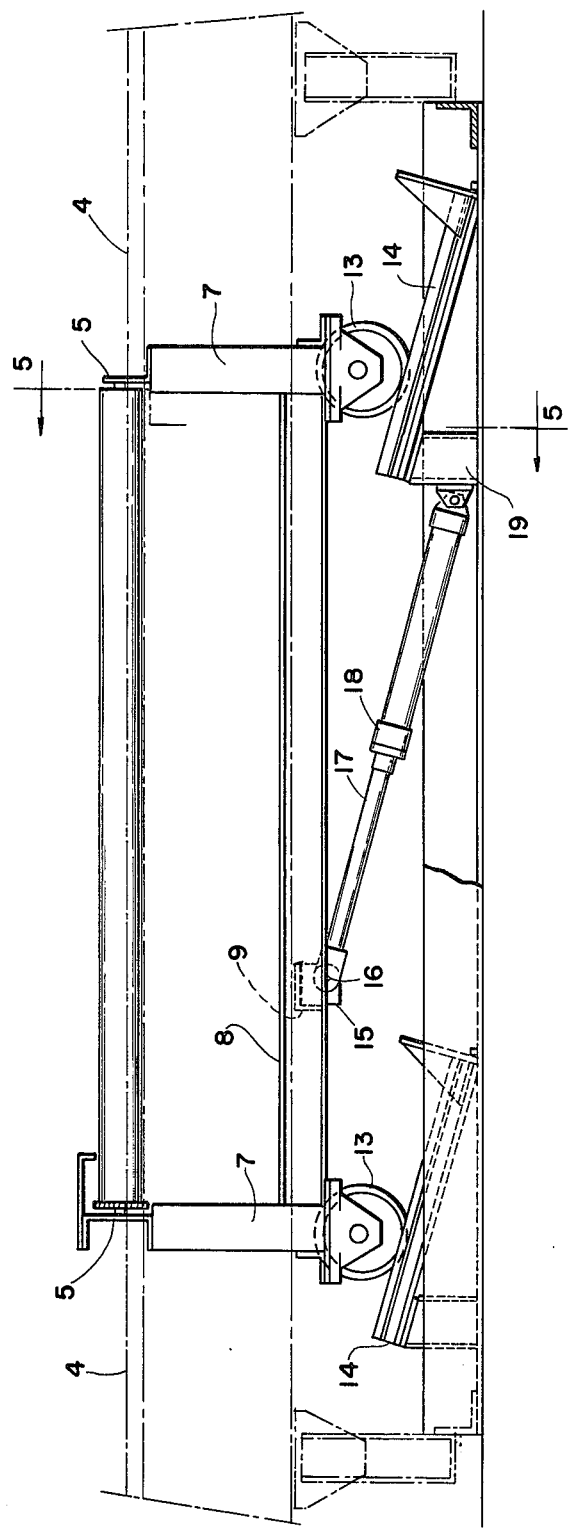
FIG. 4 is a diagrammatic elevational view of the mechanism by which the transfer of articles is accomplished.
Figure 5:
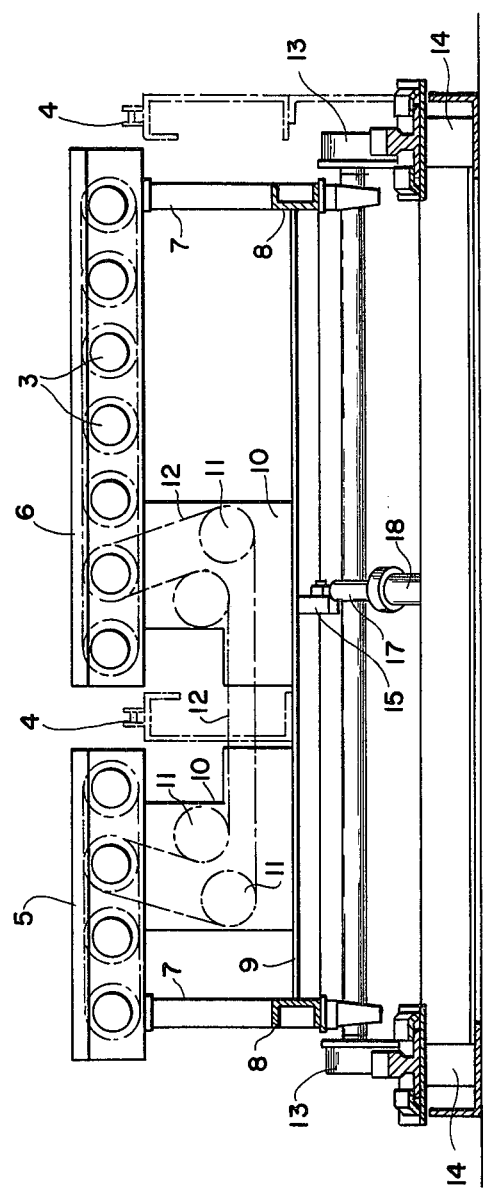
FIG. 5 is a sectional view, and somewhat diagrammatic, taken along the line 5—5 in FIG. 4.

In FIGS. 4 and 5 it can be seen that the sections 5 and 6 of the frames supporting the conveying rollers 3 are mounted on four brackets 7, and the brackets 7 at each side are supported along the respective sides by beams 8, and the beams 8 are connected together by a cross beam 9. Frames 10 are mounted in the beam structure and support chain sprockets 11 which are engaged by a drive chain 12. The drive chain 12 is operative to power the conveying rollers three mounted in each section 5 and 6 of the frame 2.

The foregoing components make up the frame 2 which through the beams 8 support wheels 13 mounted on four slanting rails 14. The cross beam 9 supports an angle bracket 15 by soldering or welding the bracket thereto so as to provide a hinge axis 16 to which is connected the outer end of piston rod 17 of an hydraulic piston motor 18. The motor 18 is hingedly connected to a base frame section 19 which supports certain of the slanted rails 14 as shown in FIG. 4.

When the motor means 18 has its piston rod 17 extended as shown in FIG. 4 the frames 5 and 6 are positioned with the rollers 3 flush with the level of the first conveying track 1. The conveying rollers 3 are not normally rotated except when it is desired to move the pallet P off of the first conveying track 1. As the pallet P is moved to be discharged from the first conveying track 1 it influences sensors 20 which initiates the rotation of the rollers 3. The rollers 3 continue the movement of the pallet P to a position where the pallet approaches close to the end position on the frame 2. As the pallet approaches the end position on the frame 2 it influences second sensors 21 which initiate the slow down and stoppage in the rotation of the conveying rollers 3, and initiates the movement through the motor means 18 of the frame 2 down the slanting rails 14 to the level of the conveying chains 4. The sensors 20 and 21 may comprise photo-electric means, or may be limit switches or may be proximity switches. The foregoing description of displacement or transfer of at least one pallet is clearly diagrammatically illustrated in progressive positions shown in FIGS. 1, 2 and 3.

As already mentioned, FIG. 1 shows the position of a pallet P at the moment where said pallet passes by a sensor 20. By means of said sensor, the rollers 3 are brought into motion while the frame 2 remains flush with conveying track 1. It is when pallet P influences sensor 21 (FIG. 2) that action is taken to lower the rotation speed of rollers 3. The pallet reaches low speed at the end position thereof on the frame 2 and as said pallet reaches the end position, the frame 2 is also lowered in such a way that the pallet P is set down on the chains 4. The frame 2 is further lowered to cause the pallet to be taken over by the chains 4 which are preferably continuously driven. As the frame 2 further goes down below the level of both parallel chains 4, the pallet is completely taken over by said chains. Due to the pallet moving as it goes down, along in the same direction as the chains 4, the taking over of the pallet by the chains 4 occurs with a speed which makes it possible to retain a very high flow rate in the installation.

When a pallet P influences a third sensor 22, that is when the pallet has moved to a distance to clear the frame 2 during its downward movement toward the plane of the parallel chains 4, the movement of said frame 2 is reversed and brought back up by the response of said sensor 22. Due to the extension of the piston rod 17, the frame goes back to the original position thereof at the level of the first conveying track 1.

Figure 6:
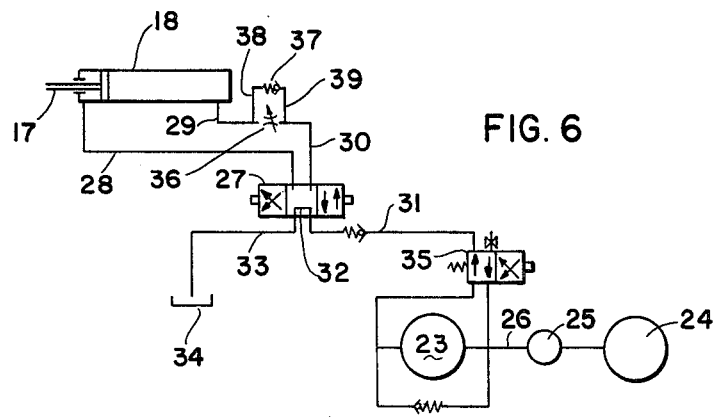
FIG. 6 illustrates the embodiment of hydraulic circuitry and the position of control valves therein for effecting the transfer of an article from the first conveyor to the frame supporting the conveying rollers.
Figure 7:
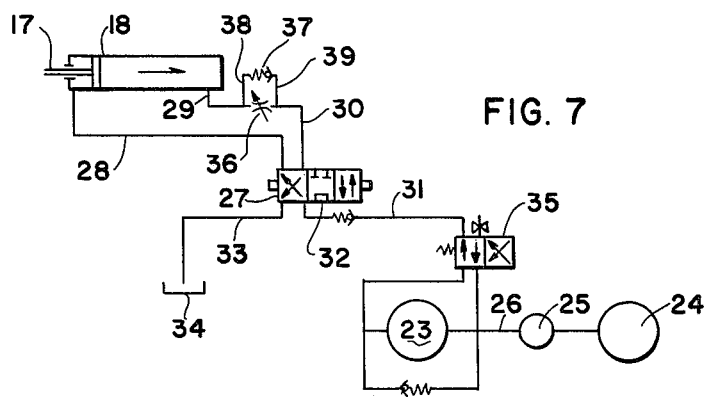
FIG. 7 is a view similar to FIG. 6 showing a more advanced position of the article.
Figure 8:
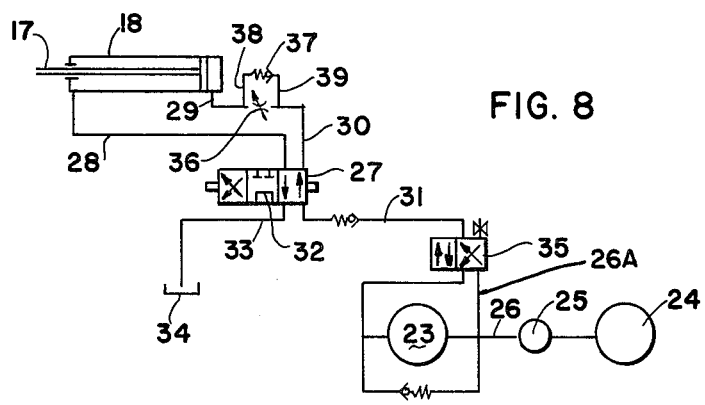
FIG. 8 is a view similar to FIG. 6 but showing the position of the control valves upon the completion of the transfer of an article when it has been lowered to the second conveyor.

To allow said movements of frame 2 to occur in a simple way, use can be made of hydraulic device as shown diagrammatically in FIGS. 6, 7 and 8. In these figures, the hydraulic motor means operating the mechanism in FIGS. 4 and 5 is also referenced 18 and the piston rod is referenced 17. In FIGS. 6 to 8, the various positions of the piston rod 17 and thus of frame 2 and a number of valves have been shown for three different essential positions of a pallet P.

In describing FIG. 6, it is understood that both parts 5 and 6 of the frame 2 lies at the level of the first conveying track 1 and the hydraulic motor means 23 rotates at a constant speed under the control of the arrangement comprised of electric motor 24, pump 25 and line 26. The motor means 23 drives the sprocket wheels 11 through the chain 12. The conveying rollers 3 in frame parts 5 and 6 are driven thereby through the chains 12. Due to the position of valve 27, no hydraulic liquid flows to the piston 18, which means that the piston rod 17 will retain the frame 2 in the uppermost position thereof. This is also the case as long as the valve 27 lies in the position shown in FIG. 6.

No liquid flows through the lines 28-29-30 while liquid flows through the lines 31-32-33 due to the position of valve 35. The liquid flows in this position of frame 2, to a tank 34. In said position of frame 2, valve 35 also lies in the position "where the frames 5 and 6 are flush with conveyor 1" shown in FIG. 1, whereby no hydraulic liquid flows through the lines 28-29-30.

When a pallet P comes close to sensor 21 or reaches "the same to interrupt the beam, suitable control means responsive thereto operates valve 27 and causes it to move over to the position as shown in" FIG. 7, while valve 35 remains in the same position shown in FIG. 6. "Now, with the valves 35 and 27 set in this manner the motor 23 driving rollers 3 is slowed down due to liquid being used to actuate motor means 18 to start the frames 5 and 6 moving down the ramps 14, shown in FIG. 4. Thus, simultaneous motions are being generated."

The motor means 23 still rotates and thus it goes on driving the conveying rollers 3 through the sprocket wheels 11 and the chains 12. The liquid then flows from the pump 25 to the motor 23 and through valve 35, line 31, valve 27 and line 28 to the cylinder 18 to move the piston along the direction shown by an arrow in FIG. 7, thereby lowering frame 2. As however the motor means 23 and the cylinder 18 are volume-coupled, and the liquid which flows from the cylinder 18 to the line 29 is braked down by the throttle valve 36 (the non-return valve 37 "connected across throttle valve 36 by lines 38 and 39" prevents in this position the liquid flowing back through the lines 38 and 39), the rotation of motor means 23 slows down during this phase and the piston rod 17 of piston 18 moves with a speed which is slower than the speed with which the piston rod has been extended from the cylinder; this means that the frame 2 moves down more slowly at this moment than after being returned to its original position.

The control diagram of FIG. 7 confirms that the hydraulic motor 23 for driving the rollers 3 in the movable frames 5 and 6 is volume-coupled with the cylinder 18, whereby the rollers slow down and the piston rod 17 initiates descent of the frames 5 and 6 along the ramps 14. This is a simultaneous function. Now, in FIG. 8 the valve 35 has been moved to a position (to the left from the position shown in FIG. 7) where liquid does not supply motor 23, thereby stopping the drive chain 12 and the rollers 3 so the article thereon ceases further movement relative to the frames 5 and 6. In this state of the valve 35, liquid flows directly through by-pass line 26A to valve 35 and through lines 31, 30, throttle valve 36, line 29 to cylinder 18 where it now acts to reverse the direction of movement of the frames 5 and 6 so those frames move up the ramps 14 to the level of the feed conveyor 1. The liquid at the left of the piston in cylinder 18 is displaced through line 28, valve 27, line 33 and back to the tank 34. The control functions illustrated in FIG. 8 are brought about by the pallet P breaking the light beam projected between sensors 21 and the pallet P on chain 4 actuating sensors 22.

In the sequence of operation it is clear that the frames 5 and 6 do not move laterally of the position shown in FIG. 5, but these frames do move in a vertical direction and simultaneously angularly down and up the ramps 14 so that on the down move the pallet P is being advanced in the direction of movement of the chains 4. Simultaneously with the early descending movement of the pallet P it is being moved by the rollers 3 in frames 5 and 6 to a position where it can be set down to span the distance between chains 4 and be supported thereby.

What is claimed is:

1. Device for changing the direction of movement by 90° of a pallet supported on conveying means which device comprises: a pallet delivery conveyor having a discharge end at a first level; roller conveyor means having conveying rollers forming a surface to receive a pallet from the discharge end of said delivery conveyor; support means for said roller conveyor means, said support means including slanting surfaces adapted to position said roller conveyor means at said first level and to permit said roller conveyor to descend to a lower level and in a direction at 90° to the direction of pallet delivery from said delivery conveyor first motor means operatively connected to said support means for moving said roller conveyor means between said first and lower levels; other conveyor means operatively disposed at said lower level and movable in a direction at 90° to the direction of pallet movement from said delivery conveyor; second motor means operatively connected to said conveying rollers in said roller conveyor means; a source of motive power connected to said first and second motor means, and including controllable means in the connection; and sensor means in control of said controllable means whereby said conveying rollers are driven at a first speed when a pallet is delivered thereto, are driven at a lower speed when a pallet comes close to being fully on said roller receiving surface, and are stopped when a pallet has reached a position fully on said roller receiving surface; and said roller conveying means is moved along said slanting surfaces by said first motor means from said first level toward said lower level and in a direction to move with said other conveyor means.

2. Device as defined in claim 1, in which said first and second motor means are comprised of hydraulic motors connected to said source of motive power, said second motor means drives said conveying rollers and said first motor means operates said roller conveying means along said slanting surfaces, and said controllable means including a series of valves for determining according to the position of a pallet in the device, the direction along which the first motor means works and the effect of said second motor means on the rotation speed or stoppage of said conveying rollers.

3. Device as defined in claim 1, in which the motive power to said first and second motor means in series brakes down the speed of said conveying rollers to said lower speed, and the motive power only to said first motor means stops said conveying rollers for positioning the pallet over said other conveying means.

4. Device as defined in claim 2 in which one of said valves is selectively movable from a position disabling said first motor means from moving said conveying rollers from said frsst level to a position coupling said first and second motor means and to a position enabling said first motor means to move said roller conveyor means from said lower level to said first level.

5. Device as defined in claim 1 in which said connection of said source of motive power to said first motor means includes a throttle valve and a control valve, said control valve being movable between positions selectively regulating the operation of said first motor means in opposite directions and said throttle valve being effective to determine the speed of movement of said first motor means for each direction of movement thereof.

* * * * *